United States Patent
Munnich et al.

[15] 3,695,391
[45] Oct. 3, 1972

[54] MOUNTING OF ROLLER BEARINGS

[72] Inventors: Hermann Munnich, Bad Kissingen; Franz Markert, Schweinfurt, both of Germany

[73] Assignee: SKF Kugellagerfabriken GmbH, Schweinfurt, Germany

[22] Filed: Jan. 16, 1970

[21] Appl. No.: 3,274

[30] Foreign Application Priority Data
Jan. 17, 1969   Germany..........P 19 02 254.9

[52] U.S. Cl. .................184/1 E, 252/25, 308/207 A
[51] Int. Cl. .................................................F01m 9/02
[58] Field of Search ....208/18; 252/25; 184/1 E, 1 R; 308/207 A, 189 A

[56] References Cited
UNITED STATES PATENTS

| | | |
|---|---|---|
| 496,888 | 5/1893 | Morrison...............308/207 A |
| 3,537,996 | 11/1970 | Holst et al...............252/25 X |

*Primary Examiner*—Manvel A. Antonakas
*Attorney*—Richard Low and Murray Schaffer

[57] ABSTRACT

The use of a corrosion resistant oil comprising a major portion having a viscosity not exceeding 25 centistokes at 20° C to coat or lubricate the bearings of an axle pinion drive shaft permitting a more adequate and precise installation.

4 Claims, 2 Drawing Figures

PATENTED OCT 3 1972 3,695,391

INVENTOR.
HERMANN MUNNICH
BY FRANZ MARKERT

MOUNTING OF ROLLER BEARINGS

BACKGROUND OF THE INVENTION

The present invention relates to the installation and mounting of motorcar axle drives and in particular to the installation and mounting of the roller bearing supports for the drive pinion shaft of the rear axle.

Rear axle drives, of passenger cars, are generally required to operate with as little noise as possible. This necessitates, firstly that the gears involved be made accurately, and secondly that the bearings, supporting the pinion drive shaft, be mounted as rigidly as possible. The latter is an important operating factor, as well in large vehicles such as trucks and busses (although there noise free operation is of less concern) since, precise meshing of the teeth of the pinion and of its associated bevelled gear minimizes wear and insures a long useful life in all installations.

Conventionally this rigidly fixed support is obtained by installing a pair of adjustable conical roller bearing assemblies which are prestressed or preloaded during assembly of the vehicle. While, maximum rigidity of a bearing assembly with two relatively adjustable conical roller bearings is theoretically achieved when the rollers are presumed to be preloaded with approximately 40 percent of the axial forces which have to be absorbed by the assembly in operation, so that axial resiliency then amounts to only one half of the amount which would occur in a singular bearing assembly without pretensioning, in practice, however, a value of about 30 percent of the axial load of the pinion at maximum torque of the motor and intermediate gear is selected. This is done in order to extend the useful life of the bearings with regard to the actual force relationships in the axle drive.

It will be evident from what has already been said that a substantial negative influence on the gear noise, wear and the useful life of both the drive gears and the anti-friction bearings would no doubt result when the optimum value for pretensioning the pinion bearing is either exceeded or not reached during adjustment. It is therefore desirable that this value be maintained as precisely as possible.

Various procedures are known for mounting and adjusting the pinion shaft. Normally the bearings are coated, when manufactured, with a hypoid oil of the type having powerful extreme pressure lubrication. Thereafter when the apparatus is installed, a spacer sleeve selected according to the dimensions of the bearing and of the housing is placed between the bearings and prestressed to the assumed degree by an adjustable retaining nut secured to the shaft. The adjustment is repeated if necessary, with a differently dimensioned spacer sleeve until the desired pretensioning is achieved.

In the mass production of motorcars mounting of the rear axle gears have effected in a similar manner by employing a deformable spacer sleeve arranged between the bearings and by automatically adjusting the shaft retaining nut. When a certain prestress or loading is achieved the automatic adjustment means switches itself off. In this automated system, the prestressing force is not measured directly but is determined by measuring the deformation in the bearings or the frictional torque of the bearings. This torque is, for all practical purposes, proportional to the prestressing force at low rotary shaft speeds. In essence the pinion is driven up to a maximum speed of about 200 RPM and the rotary torque resulting from the friction in the bearings, determined relative to the housing by a suitable measuring device which in turn is adapted to control the adjusting mechanism of the retaining ring.

It is an object of the present invention to provide an improved method for installing anti-friction roller bearings for supporting the pinion shaft of motor axle drives.

It is a particular object of the present invention to provide an improved method for measuring the adjustability and performance of pinion shaft support of motor car drives.

It is another object of the present invention to provide an improved method of prestressing conical roller bearings supporting the pinion shaft of a rear axle drive while employing conventional apparatus.

These and other objects will be apparent from the following description.

SUMMARY OF THE INVENTION

In accordance with the present invention the use of an oil having a viscosity not exceeding 25 centistokes at 20° C at the adjusting conditions, permits a more adequate and precise installation.

It is preferred that the oil be coated or applied to the bearing during manufacture however, it is necessary only to do so at least at the time the installation is made.

It is also possible to add to the oil, additives even of a thixotropic nature having apparent viscosities greater than 25 cST at 20° C to provide certain of the necessary high pressure and shearing benefits required for prolonged use.

While normal techniques for installing the bearings may be employed, the use of the present invention enhances and makes more accurate, efficient and easier automatic techniques for installing the bearings in which the stress or tensioning loads are derived by measurement of the frictional torque or moment or by measurement of the shaft deformation rather than the direct measurement of the prestress or tension.

These features as well as other will be apparent from the following description in which reference is made to the attached drawings.

DESCRIPTION OF INVENTION

Recently conical roller bearings have been developed in which the peak to valley height of the interacting front and guide faces is very small permitting a higher degree of hydrodynamic lubrication to be obtained. These bearings have the advantage that they have a relatively shorter break-in period and that the bearing friction is very small. However, they show a very distinct low moment of friction when lubricated with hypoid oil particularly when driven in a range of between 20 and 50 RPM.

Figure 1:
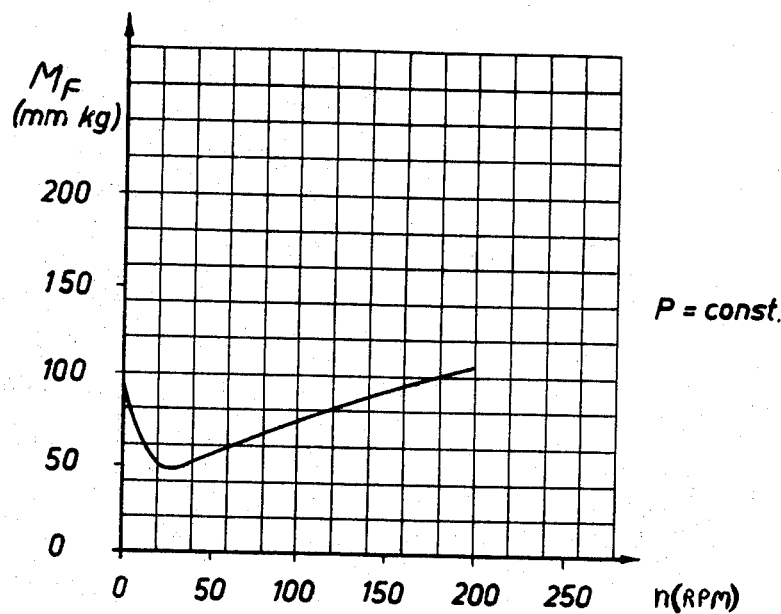
FIG. 1 is a graph of the curve of the frictional torque as a function of rotary speed in a bearing installed in accordance with the prior art.

FIG. 1 shows a curve which indicates the relationship between the frictional moment ($M_F$) and rotary speed (RPM) of such a bearing having conical rollers. The data is derived from a large number of bearings, of the same dimension, each axially loaded at a constant P to simulate a prestressing of 500 kilograms and each lubricated with a hypoid oil such as S A E 90 having a viscosity of 500 centistokes at 20° C. Such oil has at 50° C, the normal running temperature, a viscosity of about 125 cST. The average values of the moment or friction torque as a function of the rotary speed as seen in the curve, indicates that it is greatly dependent on and varies with the increase in rotary speed in the range of 0 to 200 RPM. It would be necessary, therefore, in practice to maintain the rotary speed of the pinion shaft at a predetermined constant throughout the measurement and adjustment procedure, since any variation in speed would not only effect the moment of friction, used as the measure of loading, but the prestressing or loading itself. This requirement cannot satisfactorily be met with conventional equipment and it has far remained most difficult to adapt the new bearings to use as pinion shaft support.

According to the present invention it has been found that the use of an oil having a maximum of 25 centistokes at 20° C during the adjustment process, increased the reliability and effectiveness of the prestress measurement so that the conventional adjustment mechanism can be used with the newer bearings.

Anti-friction bearings of all types, not only of the newer variety having the desirable roller-to-edge contact, which contain or whose parts are coated prior to or during installation and adjustment with a lubricating and corrosion preventing oil whose viscosity has a maximum of 25 centistokes at 20° C, have been found to shift the minimum value of the moment of friction from the lower to the higher rotary speeds, in such a manner that the moment appears to have only a minor dependence on the rotary speed of the pinion shaft. Consequently variation in rotary speed has less influence of the adjustment measurement based on frictional moment, and the necessary prestress can be induced with greater accuracy and the bearings adjusted with conventional and currently available devices.

Figure 2:
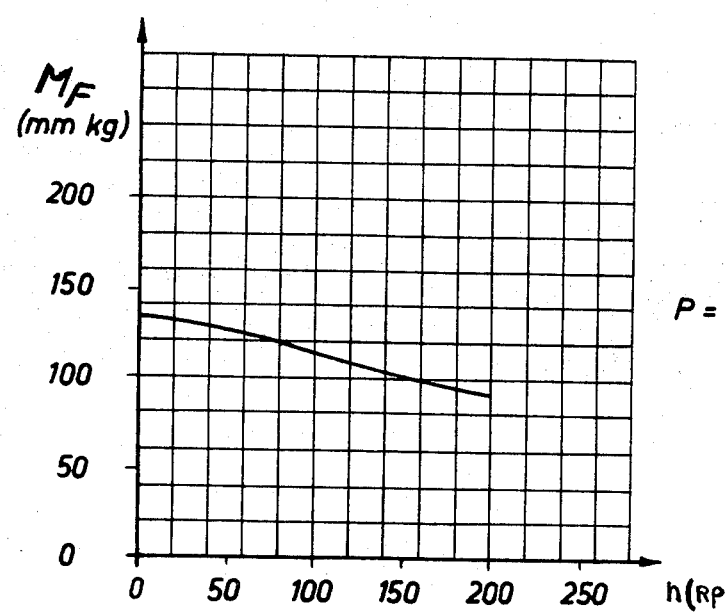
FIG. 2 is a graph of the curve of the frictional torque as a function of rotary speed in a bearing installed in accordance with the present invention.

FIG. 2 graphs a curve showing the frictional moment ($M_F$) as a function of rotary speed n (RPM) when the lubrication is achieved by means of a corrosion protecting oil having a viscosity of 19 centistokes at 20° C. The same bearings with conical rollers in which the measurements obtained with conventional lubrication with hypoid oils as shown in FIG. 1, were used. The axial loads corresponding to the prestressing again was 500 kilograms. Contrary to FIG. 1, the results of FIG. 2 show only a very slight change in the frictional moment as speed changes from 0 to 200 RPM. The slope of this change is only about 30 percent. Since in practice large differences in rotary speed do not generally occur during measurement of the frictional moment, a change in slope of only 30 percent is entirely within an acceptable and preferred range.

In contrast a hypoid oil having a viscosity of 25 centistokes at 20° C and under equal test conditions was used. The slope of the resultant characteristic curve (representing the relationship between the coefficient of torque and rotary speed) was about twice as great, thus indicating correspondingly greater dependence of the moment of friction on rotary speeds. Consequently the use of an oil with a viscosity greater than 25 centistokes 20° C is not advantageous and does not provide the benefits produced by the present invention.

As will be observed from the foregoing description of the adjustment process, by finding of the frictional moment under balanced hydrodynamic conditions, between the bearing face and abutting surfaces (as for example between the roller bearing face and the side ends of roller bearing assemblies) as it depends upon rotary speed, produces a characteristic optimum minimum value of frictional moment, to the left of which lies a range of mixed results and to right of which lies a range of hydrodynamically stabilized readings effective for proper adjustment. Noting FIG. 1, it will be obvious that, the use of high viscosity oil employed during installation results in placing the optimum minimum frictional moment within the range of variable readings produced by variances in rotary speed. Consequently in order to obtain satisfactory adjustment and reproduction, the rotary speed must be maintained constant. This is very difficult if not impossible with high or strong frictional moments.

On the other hand according to the present invention the use of an oil, during installation and adjustment having a low viscosity, shifts the frictional moment to the right as seen in FIG. 2, that is to the range of stable readings at high rotary speed. In this range of rotational speeds the frictional moment levels off near to its optimum or ideal value parallel to the n axis. That is no matter to what value the speed increases the frictional moment is maintained nearly constant. Therefore, a variation in rotary speed beyond the optimum minimum has no effect on the rotary torque or frictional moment or on the adjustment process, which can then be efficiently and accurately made.

The low viscosity oil may after adjustment and installation be removed and replaced with normal hypoid oil for operation over continued periods of time.

Within the framework of this invention various lubricating and corrosion preventing oil additives may be employed. Corrosion protecting oils of low viscosity may be easily provided with additives for improving the ability of the oil to coat metal parts, prevent rust and increase lubrication properties. Even corrosion preventive, film supporting and similar additives of a thixotropic nature may be added to the basic oil which, while giving the oil an apparent viscosity greater than 25 cST, fluidize on mechanical stress during the adjustment process so that the viscosity under adjustment conditions, falls below the 25 cST. Such additives are extremely beneficial and long lasting, and are themselves used in bearing under operating conditions. This is of great advantage when the oil is coated on the bearings during manufacture. In this manner the bearings are ready for immediate installation after being uncrated, without the necessity of washing out the corrosion protecting agent and rewetting the bearings with hypoid oil.

The use of the oils of the invention is not limited to anti-friction bearings having conical rollers but can be employed in an analogous manner in other adjustable anti-friction bearings.

It will thus be observed that the present invention provides a simple procedure enhancing the ability to employ existing mechanical techniques for installing, prestressing and adjusting bearings, which is more efficient and more accurate. Furthermore, the present invention enables the use of new bearing devices not heretofore usable. It also enables the use of oils compatible with regular crankcase automotive oils and eliminates the need for special oils, greases and added steps to decontaminate and wash the parts. Above all, the performance, efficiency and life of bearing supports are increased.

What is claimed:

1. A method of installing and adjusting bearing supports on axle pinion drive shafts of motors comprising the steps of immersing said bearings in an oil composition having a viscosity not exceeding 25 centistokes at 20° C and installing and adjusting said immersed bearings on said shaft within predetermined limits of prestressing and frictional moments relative to the rotary speed of said shaft.

2. The method according to claim 1, wherein said bearing supports comprise conical roller bearing assemblies having a low ratio peak to valley height of the interacting front and guide faces.

3. The method according to claim 1 including the steps of assembling said bearing in said oil and storing said bearing preparatory to installation.

4. The method according to claim 3 wherein sand oil includes a corrosion inhibitor additive.

* * * * *